Patented Feb. 6, 1951

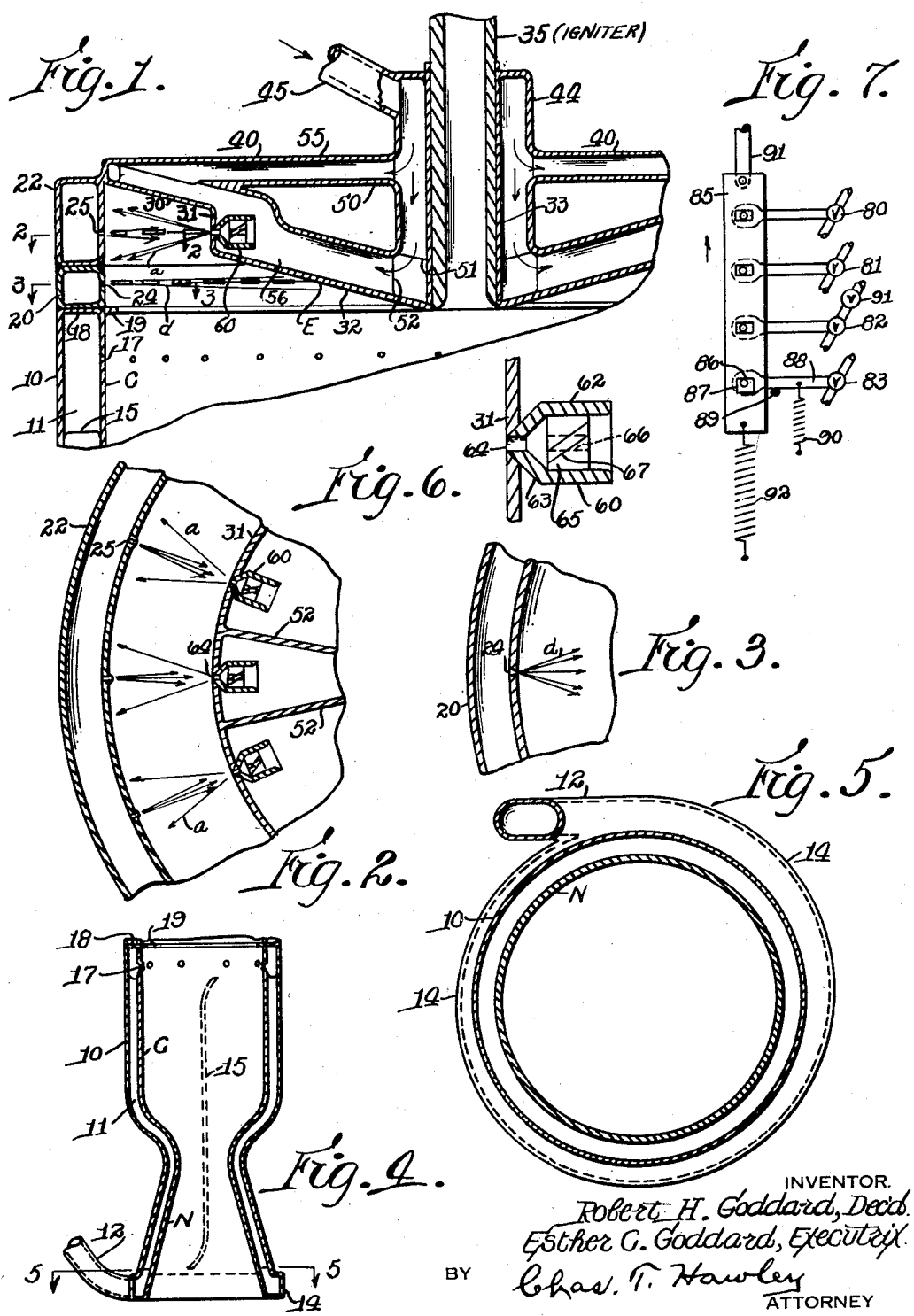

2,540,666

UNITED STATES PATENT OFFICE 2,540,666

FUEL FEEDING AND PREMIXING APPARATUS FOR COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application June 25, 1947, Serial No. 756,862

5 Claims. (Cl. 60—44)

This invention relates to combustion chambers as used primarily in rockets and in propulsion apparatus of the jet type.

More specifically, the invention relates to combustion chambers in which two liquids, as gasoline and liquid oxygen, are used and in which mixing of the liquids takes place within the combustion chamber itself.

It has been found that more complete and intimate mixing takes place if the associated liquids are not directly exposed to the flames in a combustion chamber until fairly complete mixing has been attained.

It is the general object of the present invention to provide a construction in which premixing of the combustion liquids may take place within a combustion chamber but behind a screen or shield formed of one of the combustion liquids, which shield protects the associated liquids to a substantial extent from direct contact with flames until premixing is substantially effected.

The invention further relates to arrangements and combinations of parts which will be hereinafter described and more particularly pointed out in the appended claims.

A preferred form of the invention is shown in the drawing, in which

Fig. 1 is a sectional elevation of an upper portion of a combustion chamber;

Figs. 2 and 3 are partial sectional plan views, taken along the lines 2—2 and 3—3 in Fig. 1 respectively;

Fig. 4 is a sectional elevation of the lower portion of the combustion chamber and the associated discharge nozzle;

Fig. 5 is an enlarged sectional plan view of a volute structure, taken along the line 5—5 in Fig. 4;

Fig. 6 is an enlarged sectional view of the spray nozzle shown in Fig. 1; and

Fig. 7 is a diagrammatic view of certain valve-operating devices.

Referring to the drawing, the combustion chamber C (Fig. 4) is provided with an outer casing 10 enclosing a jacket space 11. A discharge nozzle N is provided at the lower end of the combustion chamber C, and a cooling liquid, as water, is delivered through a pipe 12 to a volute 14 mounted at the lower end of the nozzle N and freely communicating with the jacket space 11.

Spaced ribs 15 are provided between the chamber C and nozzle N on the inside and the casing 10 on the outside, thus stiffening these parts and also assisting in directing water flow. These ribs have oppositely curved ends and change the direction of flow of the cooling liquid, which enters tangentially through the manifold 14, is then directed longitudinally upward, and is finally directed tangentially as it approaches the tangential discharge openings 17. The upper end of the jacket space 11 (Fig. 1) is closed by a ring or partition 18 having an inwardly projecting ledge 19 for a purpose to be described.

Two additional volutes 20 and 22 form a continuation of the chamber C at the upper end thereof. Gasoline or other liquid fuel is supplied to each of the volutes 20 and 22 and is sprayed radially inward therefrom through ports or spray openings 24 and 25.

The upper end E (Fig. 1) of the combustion chamber C is formed with an outer narrow and rather flat conical portion 30, a short and axially extended cylindrical portion 31, and a wider inner conical portion 32. The portion 32 is joined to the lower end of a tube 33 in which a tube 35 for an igniting device is mounted.

An outer casing 40 is provided above the upper end of the combustion chamber C and has an upward extension 44 secured to the upper portion of the tube 33 which supports the igniter. Liquid oxygen is fed to the extension 44 through a supply pipe 45.

A hollow spacing member 50 is mounted between the portion 32 of the cylinder end E and the outer casing 40 and is held in position by spaced axial ribs 51 and spaced radiating ribs 52.

An outer jacket space or passage 55 is thus formed between the casing 40 and the hollow member 50, and an inner jacket space or passage 56 is formed between the chamber end portions 31 and 32 and the hollow member 50, these two passages uniting above the chamber end portion 30. All portions of the chamber end are thus effectively jacketed and cooled.

Nozzle devices 60 are secured to the inner wall of the cylindrical chamber end portion 31, and are positioned entirely within the jacket space 56, as clearly shown in Fig. 1. Each nozzle device comprises a tube 62 (Fig. 6) open at its outer end and having a conical inner end portion 63 provided with a spray opening 64. A cylindrical block or rotator 65 is mounted in the tubular portion 62 and is provided with an axial passage 66 and with a plurality of helically disposed peripheral grooves 67.

Liquid oxygen is supplied through the pipe 45 to the jacket spaces 55 and 56 and flows from the space 56 through the nozzle devices 60 to the spray openings 64. As the liquid oxygen passes the blocks or rotators 66, it is given a rotating motion so that it issues from each port 64 in the form of a hollow cone, as indicated by the arrows $a$ in Figs. 1 and 2.

The ports 25 in the manifold 22 are positioned directly opposite the ports 64 of the nozzle devices 60, so that a jet of gasoline is injected directly toward each nozzle device and is received within a conical spray of liquid oxygen. This shields the gasoline during the intermingling of the gasoline and oxygen which thereafter takes place.

As the liquids are mixed and partly vaporized, they expand and form bodies of mixed combustion elements which then pass through the cones of oxygen to that portion of the combustion chamber where ignition and combustion takes place.

Flat sprays of gasoline are also injected through the ports 24 from the manifold 20, as indicated at $d$ in Fig. 3. These gasoline sprays are in limited amount only and are provided to insure ignition during starting. After the combustion chamber is in full operation, delivery of gasoline through the ports 24 is discontinued.

The general shape and construction of the manifolds 20 and 22 is substantially the same as that of the manifold 14 shown in Fig. 5. Valves 80, 81, 82 and 83 (Fig. 7) are provided to control the supply of water and oxygen, and also to separately control the supply of gasoline to the manifolds 20 and 22. Supply connections to the volutes 20 and 22 may be as shown in Fig. 5 for the volute 14.

In starting the apparatus, oxygen and gasoline are first admitted through the ports 64 and the lower ports 24 respectively and combustion is started. Water may be admitted at the same time for cooling the chamber wall. Additional gasoline is admitted through the upper ports 25 slightly after the admission of oxygen through the ports 64. Such admission must be accurately timed, as otherwise streams of gasoline might enter through the ports 25 and be frozen in the ports 64, or the liquid oxygen might freeze the gasoline as it starts to flow through the ports 25.

To terminate the operation of the combustion chamber, the flow of all of the liquids may be simultaneously discontinued.

In Fig. 7, mechanism is shown diagrammatically by which the flow of liquids as above described may be conveniently controlled. Valves 80, 81 and 82 have pin and slot connections to a bar 85 and control the water and oxygen and the gasoline for the volute 20 and the lower ports 24. A valve 83 controls the supply of gasoline to the manifold 22 and upper ports 25, and has an arm 88 having a pin 86 in an elongated slot 87. The pin-supporting arm 88 is held against a stop 89 by a spring 90.

The bar 85 may be connected by a link 91 to any convenient actuating mechanism, either manual or automatic, and a spring 92 assists the return movement of the bar 85.

As the bar 85 is moved upward when starting combustion, the valves 80, 81 and 82 are promptly opened, but the opening of the valve 83 is slightly delayed, due to the extra length of the slot 87.

On the return movement of the bar 85 for discontinuing operations, the spring 90 will close the valve 83 as promptly as downward movement of the bar 85 closes the other valves.

After the chamber is in full operation, the supply of gasoline to the volute 20 and ports 24 may be discontinued by closing a valve 91 (Fig. 7).

The inwardly projecting ledges 19 prevent the water spray from diluting the gasoline entering through the openings 24.

The fuel feeding and premixing apparatus herein shown and described is simple in construction and reliable in operation and is highly efficient for its intended purposes. By the use of this apparatus, the provision of a separate premixing chamber is avoided and the combustion apparatus as a whole is correspondingly simplified.

Having thus described the invention and the advantages thereof, it will be understood that the invention is not to be limited to the details herein disclosed, otherwise than as set forth in the claims, but what is claimed is:

1. In a combustion chamber, means forming an outer annular premixing area having inner and outer walls, outwardly directed nozzles mounted within the inner wall and producing conical expanding sprays of liquid oxygen, and said outer wall having a series of jet openings through which jets of gasoline are directed toward and within said expanding oxygen sprays, and means to supply said combustion liquids under pressure to said nozzles and to said jet openings.

2. The combination in a combustion chamber as set forth in claim 1, in which each nozzle has a rotator which produces a whirling and expanding spray.

3. The combination in a combustion chamber as set forth in claim 1, in which a plurality of auxiliary lower ports are provided adjacent said jet openings to supply additional fuel jets for starting, and in which separate means is provided to control the fuel supply to said auxiliary lower ports.

4. The combination in a combustion chamber as set forth in claim 1, in which means is provided to supply gasoline for said gasoline jets very slightly after oxygen is supplied for the expanding oxygen sprays.

5. An elongated combustion chamber of circular cross section having a jacketed side wall, a double-wall outer end jacket portion and an inner double-wall chamber end, said end portion and said chamber end each enclosing a space for a cooling liquid, said spaces being connected in their axial portions and at their peripheries, outwardly and radially directed nozzles mounted in the chamber-end space at a substantial distance within said side wall, and means to supply a combustion liquid under pressure to said double-wall spaces and to said nozzles.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,743,621 | Quinn | Jan. 14, 1930 |
| 2,111,432 | Macchi | Mar. 15, 1938 |
| 2,164,225 | Walker | June 27, 1939 |
| 2,395,403 | Goddard | Feb. 26, 1946 |
| 2,404,335 | Whittle | July 16, 1946 |

FOREIGN PATENTS

| Number | Country | Date |
|---|---|---|
| 27,718 | Great Britain | Dec. 21, 1908 |